(12) United States Patent
Stone et al.

(10) Patent No.: US 6,497,977 B1
(45) Date of Patent: Dec. 24, 2002

(54) METHOD OF MAKING STRIPPED POROUS POLYMER FILMS

(75) Inventors: Charles Stone, West Vancouver (CA); Dave Summers, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/451,478

(22) Filed: Nov. 30, 1999

(51) Int. Cl.[7] .............................. H01M 2/14; C08F 6/10; B01D 39/14
(52) U.S. Cl. ..................... 429/129; 528/500; 528/502; 428/409; 210/490; 210/500
(58) Field of Search ................. 210/490, 500; 528/500–502; 429/129–32; 428/409

(56) References Cited

U.S. PATENT DOCUMENTS

| | | | |
|---|---|---|---|
| 4,097,383 A | 6/1978 | Ohtani et al. | 210/500 |
| 4,187,390 A | 2/1980 | Gore | 174/102 R |
| 5,362,760 A | 11/1994 | Bulters et al. | 521/54 |
| 5,503,791 A | 4/1996 | Fortuin et al. | 264/210.3 |
| 5,525,694 A | 6/1996 | Fortuin et al. | 526/348.1 |
| 5,834,523 A | 11/1998 | Steck et al. | 521/27 |

FOREIGN PATENT DOCUMENTS

| | | | | |
|---|---|---|---|---|
| AU | 200115068 | * | 6/2001 | B01D/67/00 |
| EP | 0 378 279 A1 | | 7/1990 | |
| JP | 11-165050 | | 12/1997 | |
| WO | WO 98/20063 | | 5/1998 | |
| WO | WO 200139871 | * | 6/2001 | B01D/67/00 |

OTHER PUBLICATIONS

Pocius et al. "Mechanical Surface Preparationo f Graphite–Epoxy Composte for Adhesive Bonding," *SAMPE* pp. 50–58 (1985).

Hoffman, "Surface Modification of Polymers: Physical, Chemical, Mechanical and Bioligcal Methods," *Macromol. Symp. 101*:443–454 (1996).

* cited by examiner

*Primary Examiner*—Steven P. Griffin
*Assistant Examiner*—Mark Ruthkosky
(74) *Attorney, Agent, or Firm*—McAndrews, Held & Malloy, Ltd.

(57) ABSTRACT

Stripped porous polymer film and a method for making such film from substantially heterogeneous porous polymer film are described. The heterogeneous film has surface characteristics that are different from the characteristics of the interior bulk material, and the method comprises mechanically stripping at least a portion of at least one surface layer from the heterogeneous film. The stripped porous polymer film may be incorporated into composite membranes. Such composite membranes are particularly suitable for incorporation into membrane electrode assemblies for use in electrochemical cells, including electrochemical fuel cells.

17 Claims, 6 Drawing Sheets

METHOD OF MAKING STRIPPED POROUS POLYMER FILMS

FIELD OF THE INVENTION

The present invention relates to stripped porous polymer films, as well as methods for preparing such films from substantially heterogeneous porous polymer films.

BACKGROUND OF THE INVENTION

Porous polymer films are used in a wide variety of applications such as liquid and gas filtration, waterproof breathable fabrics, controlled-release systems, batteries, and fuel cells. Such films may be prepared by a variety of methods. For example, microporous polymer films may be made by extruding a solution of a polyalkene into a film, cooling the resulting film to below the gelling point of the solution, then removing the solvent and stretching the solvent-free film in at least one direction. A process of this kind is disclosed in European Patent Publication No. 0378279 A1, in which a solution of polyethylene in decalin is cooled to below the gelling point, the gel is extruded to form a film from which decalin is removed by evaporation, and the resulting film is then stretched in at least one direction to increase its porosity and mechanical strength.

The applicability of a particular porous polymer film for a given use generally depends upon the structural properties of the film and the properties of its constituent monomers/polymers. For example, known porous polymer films vary in dimensional stability at higher temperatures, thermal/electrical conductivity, mechanical stiffness and mechanical strength, as well as chemical reactivity. Such variation may be due to one or more factors such as, for example, the properties of the constituent monomers/polymers, the effective molecular weight, density, porosity, pore size, thickness, and degree of crosslinking of the film.

Known porous polymer films also may have surface characteristics that are different from those of the interior bulk material. For example, DSM Solutech B.V. manufactures and markets microporous ultra-high molecular weight polyethylene (UHMWPE) membrane materials under the tradename Solupor® that have higher surface densities and as such have smaller average surface pore sizes relative to the interior bulk material.

Porous polymer films may be useful as substrates for making composite membranes, for example. Particulate solids, polymers that are poor film formers, or polymers that form dense films with mechanical properties that would limit their use in certain applications, can be inserted in pores of a porous polymer film. The resulting composite membranes can have the desired physical properties for use in a wide range of applications. Composite ion exchange membranes suitable for use in electrolytic cells and fuel cells have been described. For example, U.S. Pat. No. 5,834,523 discloses composite membranes comprising porous sheet materials impregnated with α,β,β-trifluorostyrene-based polymeric compositions; suitable microporous films include polyethylene and expanded polytetrafluoroethylene. Composite ion exchange membranes are often preferred in fuel cell applications because they generally have increased mechanical strength in the dry state (which increases ease of handling, for example), and increased dimensional stability (changes in the dimensions of the membrane due to changes in the degree of hydration) in the wet state, compared to dense film ionomeric membranes made by casting or extrusion.

In fuel cell applications, in particular, suitable porous films for incorporation into composite ion exchange membranes preferably have good mechanical and structural properties, a substantially uniform porosity, and are chemically inert. Known porous polymer films can have the requisite mechanical properties, porosity, and chemical inertness. However, the aforementioned difference in the surface characteristics compared to the characteristics of the interior bulk material of some such porous films can be disadvantageous. For example, such heterogeneous films can be resistant to filling with an ion exchange polymer. A polymer solution, for example, brought into contact with the surface of the film may not penetrate the film easily, presumably due to surface density characteristics and/or smaller surface pore size. A more homogeneous porous polymer film having the requisite physical and chemical properties would therefore be advantageous.

A variety of methods may be employed to facilitate penetration of materials into heterogeneous porous polymer films. Surfactant additives have been used to overcome adverse surface interactions with solutions and thereby facilitate penetration, but the presence of surfactants in the final product can be detrimental to subsequent performance of the films, depending upon the application. Furthermore, the removal of surfactants from the final product can be both difficult and costly. The surface density of a heterogeneous porous polymer film could be modified by various means, such as chemical modification (for example, acid etching), heavy atom/particle bombardment, laser ablation, or micromachining. Such methods can also be costly, however, and may undesirably alter the chemical or structural characteristics of the polymer film surface. Alternatively, the surface layer of a heterogeneous porous polymer film could be removed by high frequency vibrational polishing using a liquid abrasive slurry. However, the process may be difficult to control and/or reproducibility may be difficult to achieve. In any event, the liquid slurry would then need to be removed from the treated porous polymer film, adding an additional step.

A simple and cost-effective method for making a stripped porous polymer film suitable for use as a membrane or substrate in a variety of applications is described herein. The described method involves stripping at least a portion of a surface layer of a heterogeneous porous polymer film, resulting in a more homogeneous porous film.

Also described is a stripped porous polymer film used as a substrate material and composite membranes employing said film as a substrate. Preferably at least a portion of a surface layer of the stripped microporous polymer film has surface characteristics that more closely resemble the characteristics of the interior bulk material. It may also exhibit improved permeability to, and/or penetration of, solids, liquids and gases, increased surface roughness, and increased average surface pore size, relative to the heterogeneous starting material from which it is prepared. Fuel cells, and in particular, membrane electrode assemblies employing such composite membranes, are also disclosed.

SUMMARY Of THE INVENTION

In an embodiment of a method for making a stripped porous polymer film from a substantially heterogeneous porous polymer film, the heterogeneous film having surface characteristics that are different from the characteristics of the interior bulk material, the method comprises mechanically stripping at least a portion of at least one surface layer from the heterogeneous porous film. In particular, the method may comprise applying a shearing force to at least a portion of at least one surface layer of the heterogeneous porous polymer film.

The method may comprise attaching a first anchor to a major surface of the heterogeneous porous polymer film, and applying a first shearing force via the first anchor to the major surface to remove at least a portion of a first surface layer from the heterogeneous porous polymer film. The at least a portion of the first surface layer may be associated with the major surface to which the first anchor is attached, or to the opposing surface. In the latter case, the first shearing force removes the surface to which the anchor is attached and the interior bulk material, separating them from the opposing surface.

Optionally, the method may further comprise attaching a second anchor to the opposing major surface of the heterogeneous porous polymer film, and applying a second shearing force via the second anchor to the opposing major surface to remove at least a portion of a second surface layer from the heterogeneous porous polymer film. The first and second shearing forces may be applied simultaneously. Thus, the method may also comprise stripping at least a portion of both surface layers from the heterogeneous porous polymer film, and may further comprise stripping essentially all of both surface layers from the heterogeneous porous polymer film.

Preferably, the shearing forces are applied at a substantially constant angle relative to the plane of the heterogeneous porous polymer film, most preferably at an angle of 90° or less from the plane thereof.

The method may be incorporated in a reel-to-reel process in which the heterogeneous porous polymer film is transferred from a feed roller to a collection roller, a first anchor is associated with a first stripping roller, and a first shearing force is applied by the first stripping roller to remove at least a portion of a surface layer of the heterogeneous porous polymer film. The method may include transferring the resultant partially stripped film from a feed roller to a collection roller and removing at least a portion of the other surface layer via the first anchor and first stripping roller. Optionally, the method may incorporate a reel-to-reel process wherein a second anchor is associated with a second stripping roller, and the second stripping roller applies a second shearing force to remove at least a portion of a second surface layer of the heterogeneous porous polymer film. The first and second shearing forces may be applied simultaneously.

Generally, the surface characteristics of the heterogeneous porous polymer film differ from the characteristics of the interior bulk material. Specifically, the surface density of the heterogeneous porous polymer film may be greater than the density of the interior bulk material thereof. The heterogeneous porous polymer film may be microporous. The heterogeneous porous polymer film may comprise a polymer selected from the group consisting of polyethylene, polypropylene, polyvinylidene, polyvinylidene halides, and copolymers thereof. Preferably, it comprises a microporous polymer film comprising a polymer selected from the group consisting of polyethylene, polypropylene, and ethylene-propylene copolymers. More preferably, it comprises a microporous film consisting essentially of polyethylene. Most preferably, it comprises a microporous film consisting essentially of ultra-high molecular weight polyethylene.

A second embodiment is a stripped porous polymer film, wherein the surface characteristics of the stripped film are essentially the same as the characteristics of the interior bulk material, and wherein the stripped film consists essentially of a polyalkene and is preferably made from a precursor film made by a process comprising the steps of:

(a) forming a solution of the polyalkene into a film containing a solvent;

(b) cooling the resulting film to below the gelling point of the solution;

(c) removing the solvent to yield a solvent-free film; and (d) stretching the solvent-free film in at least one direction.

The stripped porous polymer film, which may be prepared, for example, by the aforementioned methods, may comprise a polyalkene, for example, selected from the group consisting of polyethylene, polypropylene, polyvinylidene, polyvinylidene halides, and copolymers thereof. Preferably, the stripped porous polymer film comprises a polyalkene selected from the group consisting of polyethylene, polypropylene, and ethylene-propylene copolymers. More preferably, it may consist essentially of polyethylene. More preferably, the stripped porous polymer film may consist essentially of ultra-high molecular weight polyethylene.

The stripped porous polymer film may have a surface density lower than the surface density of the heterogeneous porous polymer film from which it is prepared. It may also have a rate of transplanar wicking greater than the rate of transplanar wicking of the precursor heterogeneous film. Further, it may have a Gurley number lower than the Gurley number of the precursor heterogeneous film.

Composite membranes can be made which comprise the present stripped porous polymer film at least partially filled with solid particulate or a liquid composition. For example, metals or metal oxides may be incorporated and used as catalysts. Other materials such as, but not limited to, carbon, glass, or ceramics, may also be employed, depending upon the intended use of the composite membrane.

The stripped porous polymer film in the composite may be at least partially filled with an ion exchange polymer. Optionally, the composite membrane may be at least partially impregnated with a liquid composition of ion exchange polymer. Depending upon the intended application, the resultant composite membrane may be substantially gas impermeable.

Where the composite membrane is an ion exchange membrane, it may be incorporated in a membrane electrode assembly, or in an electrochemical cell, such as a fuel cell

DETAILED DESCRIPTION OF PREFERRED EMBODIMENTS

Figure 1A:
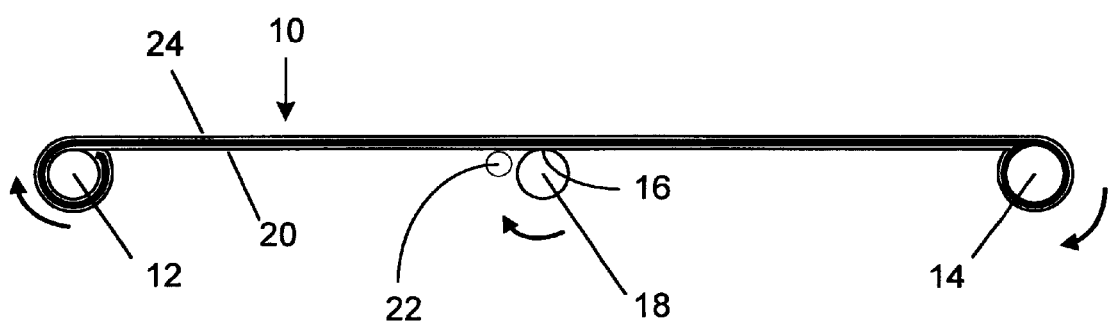
FIGS. 1a and 1b are schematic diagrams illustrating an embodiment of the present method incorporating a reel-to-reel process.

As used herein, "porous polymer films" include microporous polymer films. "Stripped", in reference to porous polymer films, means that at least a portion of the surface layer of at least one major surface thereof has been removed. "Substantially heterogeneous" means that the distribution of material at the surface of the porous polymer film is dissimilar to the distribution of the interior bulk material thereof, and more particularly, that the material is less evenly distributed at the surface as compared to the interior bulk. Conversely, "substantially homogeneous" means that the distribution of material at the surface of the porous polymer film is similar to the distribution of the interior bulk material. "Surface density" also refers to the distribution of surface material of porous polymer films: the more evenly distributed the surface material, the lower the surface density; the more aggregated the surface material, the higher the surface density. "Transplanar wickings" is a measure of the transplanar spread of a wetting liquid droplet applied to the surface of the film. "Ion exchange polymer" means any ion-containing polymer. "Liquid composition" means a neat (that is, substantially pure) liquid, a solution, suspension, or colloid.

In one embodiment of the present method, a stripped porous polymer film is made by fixing an anchor to at least one of the two major surfaces of a suitable heterogeneous porous film, and applying a shearing force via the anchor to remove at least a portion of one of the surface layers from the heterogeneous film.

For example, any suitable heterogeneous porous polyalkene film may be used, providing the interior bulk material of the film has the requisite physical and chemical properties for the particular application intended (for example, in ion exchange and membrane filtration applications, the mechanical strength of higher effective molecular weight polymers may be desirable), and that the surface thereof is amenable to removal by the stripping method disclosed. For example, it is expected that the present method is applicable to heterogeneous microporous polymer films made by processes similar to the process disclosed in published European Patent Publication No. 0378279 A1, that is, wherein the process comprises extruding a solution of a polyalkene into a film, cooling the resulting film to below the gelling point of the solution, then removing the solvent and stretching the solvent-free film in at least one direction. The applicability of the present method may be somewhat dependent, however, on the process by which the starting heterogeneous porous polymer film is produced.

In one embodiment of the present method, a microporous polymer film is temporarily secured to a flat, rigid work surface. Adhesive tape is applied to one major surface of the film, and a shearing force is applied to the film via the adhesive tape. By controlling the speed and angle at which the shearing force is applied, it is possible to remove a surface layer or a portion thereof, from the interior bulk material. Optionally, the partially stripped film can be turned over, the process of temporarily securing the film, applying adhesive tape, and applying a shearing force repeated, in order to remove at least a portion of the second surface. Although adhesive tape is described as an example of an anchor by which the shearing force is applied, it is to be understood that any suitable anchor may be employed which is attachable to the surface of the porous polymer film.

Figure 1B:
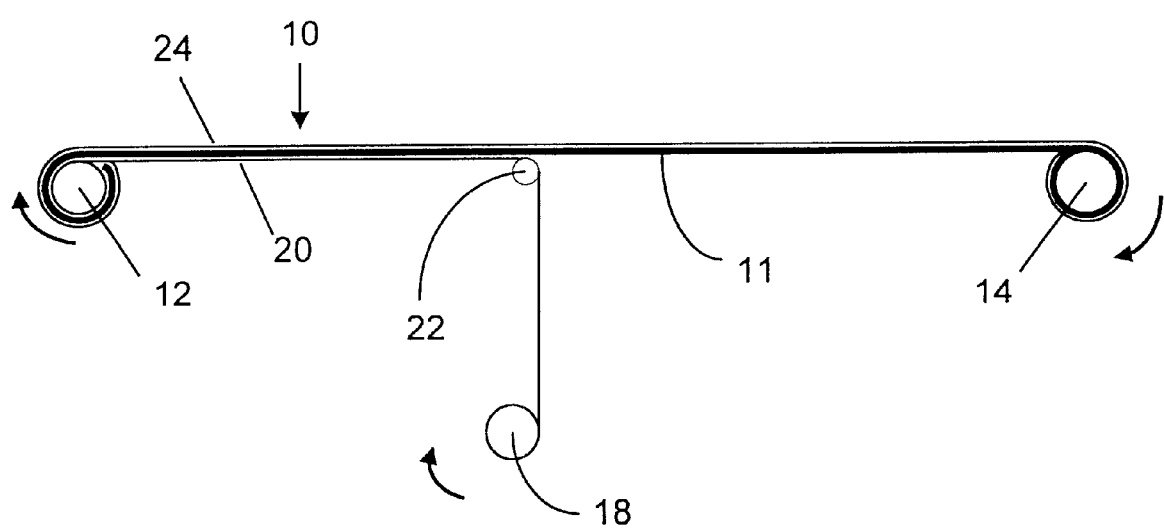

In FIGS. 1a and 1b, as well as FIGS. 2a and 2b, arrows indicate the direction of rotation of the rollers described below. FIGS. 1a and 1b are schematic diagrams of a reel-to-reel type apparatus that may be used for carrying out the described method. Porous polymer film 10 is fed from feed roller 12 to collection roller 14. Anchor 16 on stripping roller 18 attaches to major surface 20 of film 10, as shown in FIG. 1a. As film 10 is fed from feed roller 12 to collection roller 14, stripping roller 18 rotates and applies a shearing force to major surface 20 of film 10 via anchor 16. Anchor 16 may be any suitable means for attaching stripping roller 18 to major surface 20, such as, for example, an adhesive tape, or a roughened surface. The partially stripped film 11 is collected on collection roller 14, while at least a portion of the surface layer of major surface 20 of film 10 is collected on stripping roller 18. As at least a portion of the surface layer of major surface 20 is collected on stripping roller 18, stripping roller 18 may be moved away from film 10 as the amount of material collected thereon increases, as shown in FIG. 1b. As stripping roller 18 moves away from film 10, guide roller 22 assists in maintaining a substantially constant geometry of the shearing force applied to at least a portion of the surface layer of major surface 20 by stripping roller 18. Optionally, the process could be repeated with partially stripped film 11 such that at least a portion of the surface layer of major surface 24 of film 10 is stripped and collected on stripping roller 18 and a product which is at least partially stripped on both sides is collected on collection roller 14. Other approaches for stripping at least a portion of the surface layer of second major surface 24 are possible. For example, depending on the speed and geometry of the shearing force, the partially stripped film 11 may be collected on stripping roller 18, while at least a portion of the surface layer of major surface 20 is collected on collection roller 14. Similarly the product which is at least partially stripped on both sides also may be collected on stripping roller 18 and at least a portion of the surface layer of major surface 24 collected on collection roller 14. As a further example, collection roller 14 could be rotated and partially stripped film 10 fed from collection roller 14 to feed roller 12 such that at least a portion of the surface layer of major surface 24 is removed and collected on stripping roller 18 (rotating in the opposite direction) and a product which is at least partially stripped on both sides collected on feed roller 12. Other variations of this embodiment will also be evident to those skilled in the art.

Figure 2A:
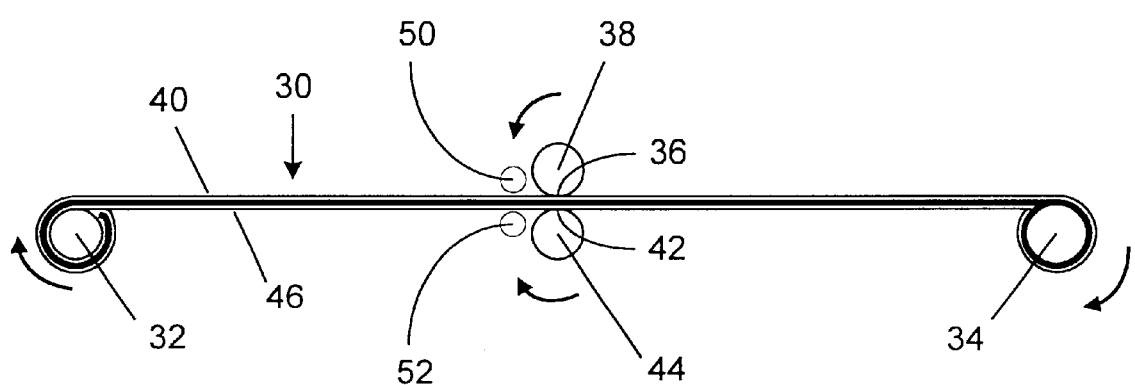
FIGS. 2a and 2b are schematic diagrams illustrating another embodiment of the present method incorporating a reel-to-reel process.
Figure 2B:
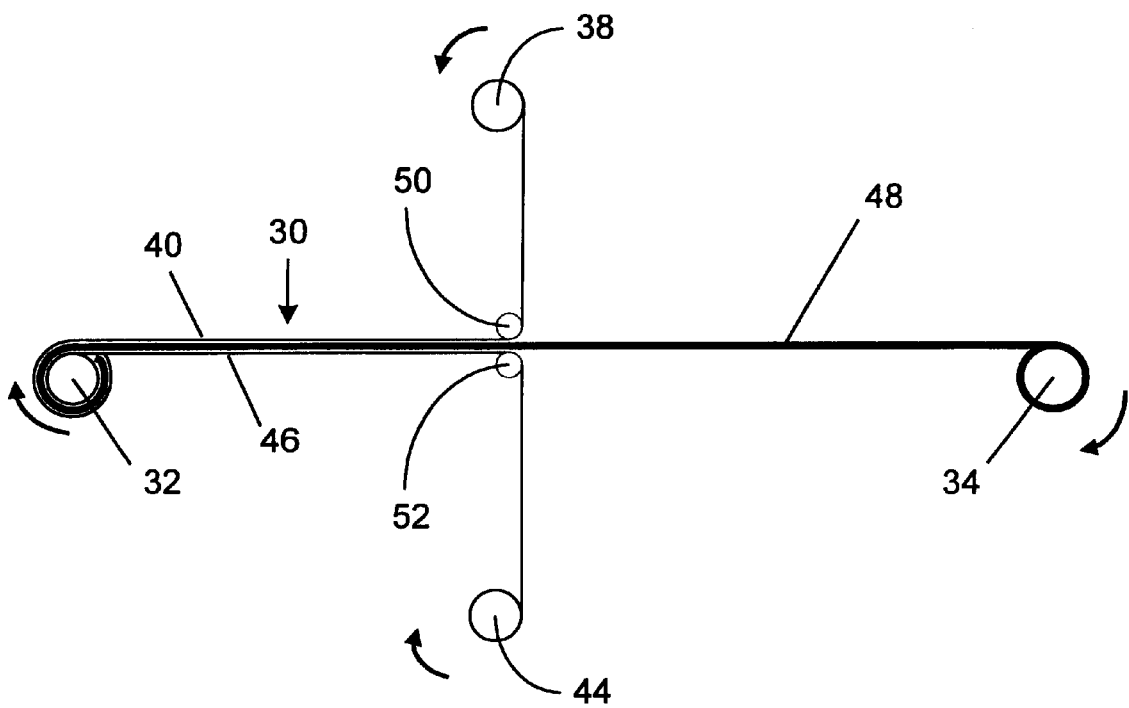

FIGS. 2a and 2b are schematic diagrams of a reel-to-reel type apparatus which may be used for carrying out the described method in which at least portions of surface layers are stripped from both surfaces of a heterogeneous porous polymer film simultaneously. As shown in FIG. 2a, stripped porous polymer film 30 is fed from feed roller 32 to collection roller 34. Anchor 36 on stripping roller 38 attaches to major surface 40 of film 30, and anchor 42 on stripping roller 44 attaches to major surface 46. As film 30 is fed from feed roller 32 to collection roller 34, stripping roller 38 rotates and applies a shearing force to major surface 40 via anchor 46, and stripping roller 44 rotates and applies a shearing force to major surface 46 via anchor 42. As shown in FIG. 2b, stripped porous polymer film 48 is collected on collection roller 34, while at least a portion of the surface layers of major surfaces 40 and 46 are collected on respective stripping rollers 38 and 44. Stripping rollers 38 and 44 may be moved away from film 30 as the amount of material collected thereon increases, as shown in FIG. 2b. As stripping rollers 38 and 44 move away from film 30, guide rollers 48 and 50, respectively, assist in maintaining a substantially constant geometry of the shearing force applied to at least a portion of the surface layer of major surfaces 40 and 46 by respective stripping rollers 38 and 44.

The following examples are provided for the purposes of illustration and are not intended to limit the present invention.

EXAMPLE 1

Preparation of Stripped Microporous Polymer Film From Ultra-High Molecular Weight Polyethylene Microporous Film (Solupor® 7P20)

A 30.5 cm×71 cm sample of Solupor® 7P20 (thickness approximately 50 $\mu$m) was placed on a flat worktable and held in place by taping the edges of the sample to the surface. A 5 cm×30.5 cm piece of adhesive tape was applied to the surface of the film roughly 1.3 cm from and parallel to one of the narrower edges such that the entire exposed width of the film was in contact with the tape. The tape adhering to the surface was pulled upward and back to apply a shearing force, causing the exposed surface layer of the film and the interior bulk material to separate from the surface layer contacting the worktable. The resultant partially stripped film was then re-taped to the worktable with the same surface uppermost. The process of applying tape was repeated as described and an approximately 10-cm length of the exposed surface was separated from the interior bulk material by applying a shearing force to the surface. The partially stripped film was then turned over, re-taped to the worktable, and adhesive tape was applied to the portion of the interior bulk material already separated from the 10-cm length of surface. The remainder of the surface was then removed from the interior bulk material by applying a shearing force, pulling the interior bulk material up and back, leaving essentially the entire surface on the worktable. The speed with which the shearing force is applied, and the angle between the layer being removed and the remainder of the sample at the interface therebetween was controlled, to ensure adequate separation of the surface layer from the rest of the sample.

EXAMPLE 2

Preparation of Stripped Microporous Polymer Film From Graft-Polymerized Ultra-High Molecular Weight Polyethylene Microporous Film (Pall GPT10201)

A 152 cm×76 cm sample of GPT10201 (trade designation of Pall Corporation) was stripped according to the method described in Example 1. GPT10201 is a microporous UHM-WPE material that has been graft polymerized with a polymer to render the material more hydrophilic.

Several tests were then performed comparing the material properties of the starting films and the stripped films of Example 1 and Example 2. The tests showed that the stripped films were substantially homogeneous relative to their respective heterogeneous starting films, having more open pores, reduced surface density, and increased surface roughness. The stripped films also demonstrated increased permeability and penetrability characteristics relative to the starting film.

Figure 3:
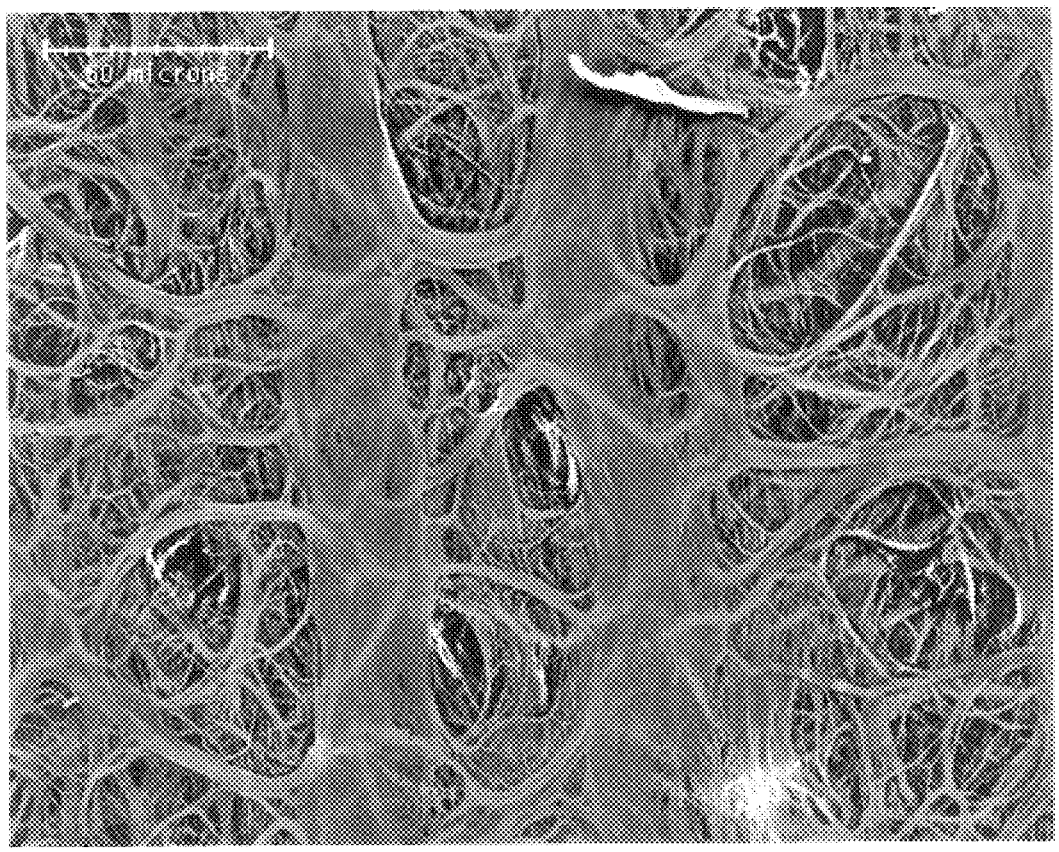
FIG. 3 is a scanning electron microscopy (SEM) photomicrograph, at a magnification of 500×, of the surface of an untreated sample of Solupor® 7P20.
Figure 4:
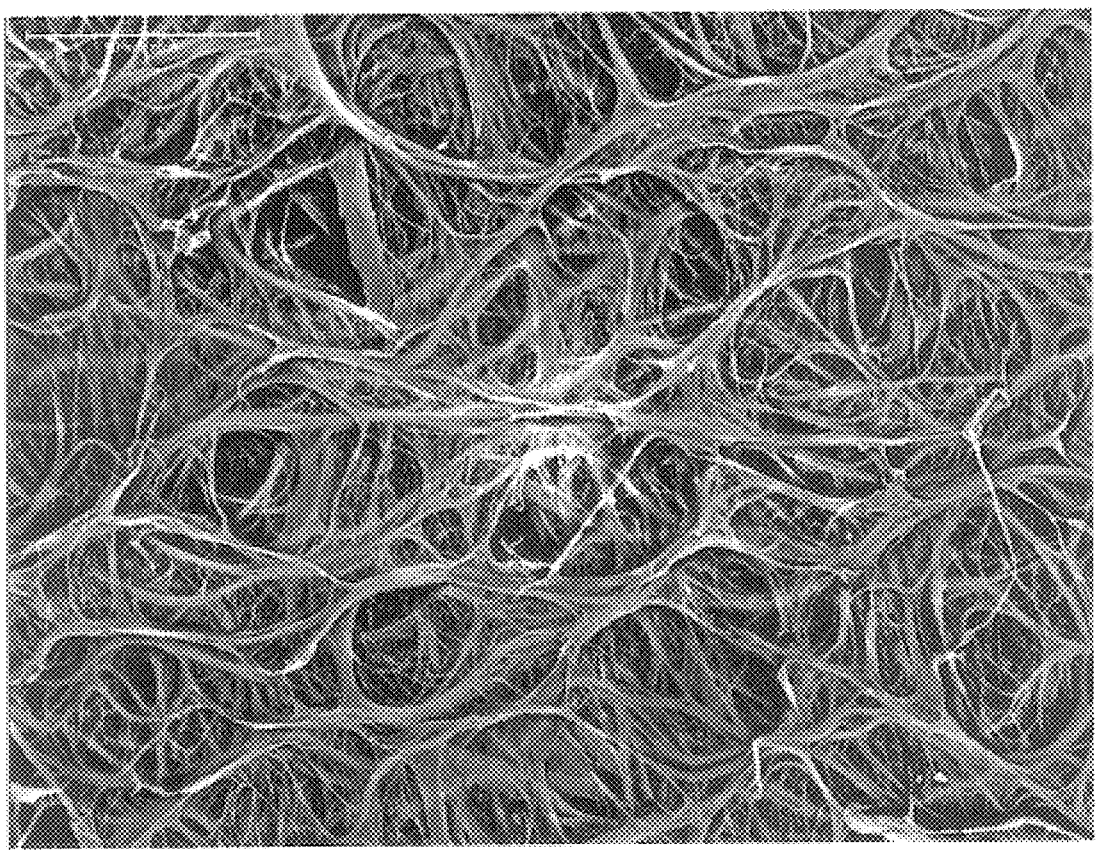
FIG. 4 is a SEM photomicrograph, at a magnification of 500×, of the surface of the sample of Solupor® 7P20 in FIG. 3, stripped according to the method described in Example 1.

SEM photomicrographs were taken of the starting film and the stripped film of Example 1. FIGS. 3 and 4 are SEM photomicrographs (500× magnification) of the starting film and stripped film, respectively. Areas of high surface density present in the starting film seen in FIG. 3 are absent from the stripped film, as shown in FIG. 4. The stripped film also exhibits more open pores at the surface compared to the starting film, as can be seen from FIGS. 3 and 4. Further, the stripped film exhibits increased surface roughness, which characteristic may be advantageous in certain applications.

The air permeability of the starting films and stripped films of Examples 1 and 2 were also measured by Gurley number determination. The Gurley number indicates the time in seconds for a specified volume of air to flow through a 0.65 cm$^2$ sample under a load of 567 g. The sample is measured in a Gurley Densitometer (ASTM standard D726-58). The sample is placed on a test platen and clamped into place. The cylinder is then dropped gently and an automatic timer (or stopwatch) is used to record the time required for 100 mL of air to be displaced by the cylinder. The Gurley number is expressed in s/100 mL. The results in Table 1 indicate that the stripped microporous films made according to the present method are significantly more air permeable than the heterogeneous starting films. The results also appear to indicate that the Example 2 material is more permeable than the Example 1 material, as evidenced by the lower Gurley number values for the Example 2 material.

TABLE 1

Gurley Number

| Sample | | Film Thickness ($\mu$m) | Gurley Number (s/100 mL) |
|---|---|---|---|
| Example 1 (Solupor ® 7P20) | Starting film | 49–53 | 60.0 ± 0.6 |
| | Stripped film | 23–26 | 21.2 ± 0.1 |
| Example 2 (Pall GPT10201) | Starting film | 47–50 | 48.5 ± 1.1 |
| | Stripped film | 14–21 | 8.3 ± 0.0 |

Transplanar wicking tests were performed to determine the rate and extent of penetration by a wetting liquid into the microporous films of Examples 1 and 2. Samples measuring 6 cm×6 cm of each of the starting and stripped films were securely mounted in aluminum frames to expose approximately 9 cm$^2$ of the microporous samples. The frame-and-sample assemblies were then placed under an Olympus S2×12 microscope equipped with a digital camera.

A solution containing 8% (w/w) of BAM® ionomer 9907147 (a copolymeric $\alpha,\beta,\beta$p-trifluorostyrene-based composition prepared by a method described in U.S. Pat. Nos. 5,422,411 and 5,773,480) dissolved in methanol was used to measure the rate of transplanar wicking within the microporous samples. A 12 $\mu$L drop of the solution was applied using a Gastight™ 100 $\mu$L syringe, from a height of 5 mm onto the center of each of the samples (t=0 seconds). Digital images of the transplanar spread of the solution droplets were collected upon the initial wetting of the sample by the droplet (at t=0 seconds) and every 4 seconds thereafter, using a computer-controlled timer, for 16 seconds.

The rate of transplanar wicking was determined by calculating the percent area increase of the wetted area over the 16-second interval, that is, the size of the wetted area at t=16 seconds was compared to the size of the wetted area at t=0 seconds (when the drop was first applied to the films). Additional spread after 16 seconds was negligible. As indicated in Table 2 below, the stripped microporous films made according to the described method demonstrated significantly improved penetration as compared to the heterogeneous starting films. In addition, the Example 2 material demonstrated superior transplanar wicking relative to the Example 1 material, both before and after stripping. It may be that the difference in rate of transplanar wicking between the materials is due to the increased hydrophilicity and/or porosity of the Example 2 material relative to the Example 1 material. In any event, both materials were amenable to the present method, and the stripped films made thereby exhibited increased air permeability and wetting liquid penetration as compared to the respective starting films.

TABLE 2

Transplanar Wicking

| Sample | | Film Thickness (μm) | % Area Increase (from t = 0 seconds to t = 16 seconds) |
|---|---|---|---|
| Example 1 (Solupor ® 7P20) | Starting film | 49–53 | 58% |
| | Stripped film | 23–26 | 209% |
| Example 2 (Pall GPT10201) | Starting film | 47–50 | 96% |
| | Stripped film | 14–21 | 230% |

EXAMPLE 3

Incorporation of Stripped and Unstripped Microporous Polymer Films Composite Ion Exchange Membranes In Composite ion exchange membranes were prepared from samples of the starting film and the stripped microporous film prepared by the method described in Example 1 by impregnating each of the samples with the BAM® 9907147 ionomer solution, as described in U.S. Pat. 5,834,523, and removing the solvent by evaporation at 65° C.

EXAMPLE 4

Use of Composite Ion exchange Membranes In a Fuel Cell

Each of the composite membranes prepared as described in Example 3 were bonded to two platinum-catalyzed carbon fiber paper electrodes at 140° C. under 6700 kPa pressure to form membrane electrode assemblies having a total platinum catalyst loading of 1 mg/cm$^2$. The resulting membrane assemblies were tested in identical Ballard Mark IV single cell fuel cells operated under substantially identical conditions, namely, 80° C. temperature, 3.02 bar for oxidant and fuel, and 2.0 and 1.5 stoichiometry, respectively, for oxidant and fuel. The voltage at 1 A/cm$^2$ was measured and the results compared. As indicated in Table 3, the fuel cell containing the composite membrane prepared from the stripped microporous polymer film according to the method described in Example 1 demonstrated significantly higher voltage as compared to the fuel cell containing the composite membrane prepared from the starting film.

TABLE 3

Fuel Cell Performance Data

| Composite Membrane Component | Voltage at 1 A/cm$^2$ (V) |
|---|---|
| Starting film | 0.474 |
| Stripped film | 0.571 |

In addition to the utility of the stripped porous polymer films described herein in ion exchange membranes for electrochemical fuel cells, it is contemplated that such stripped films will also have utility in the following applications as components of:

(1) membranes in filtration and ultrafiltration applications;

(2) proton exchange membranes in water electrolysis, which involves a reverse chemical reaction to that employed in hydrogen/oxygen electrochemical fuel cells;

(3) composite membranes in chloralkali electrolysis, which typically involves the electrolysis of a brine solution to produce chlorine and sodium hydroxide, with hydrogen as a by-product;

(4) electrode separators in conventional batteries, provided the film has the requisite chemical inertness and high electrical conductivity;

(5) ion-selective electrodes, particularly those used for the potentiometric determination of a specific ion such as $Ca^{2+}$, Na+, $K^+$ and like ions;

(6) sensor materials for humidity sensors based on ion exchange membranes, as the electrical conductivity of an ion exchange membrane varies with humidity;

(7) ion exchange membranes for separations by ion exchange chromatography—typical such applications are deionization and desalination of water, ion separations, removal of interfering ionic species, and separation and purification of biomolecules;

(8) ion exchange membranes employed in analytical pre-concentration techniques (for example, Donnan Dialysis);

(9) ion exchange membranes in electrodialysis, in which membranes are employed to separate components of an ionic solution under the driving force of an electrical current—industrial applications include desalination of brackish water, preparation of boiler feed make-up and chemical process water, de-ashing of sugar solutions, deacidification of citrus juices, separation of amino acids, and the like;

(10) membranes in dialysis applications, in which solutes diffuse from one side of the membrane (the feed side) to the other side according to their concentration gradient—applications include hemodialysis and the removal of alcohol from beer;

(11) membranes in gas separation (gas permeation) and pervaporation (liquid permeation) techniques; and

(12) bipolar membranes employed in water splitting and subsequently in the recovery of acids and bases from waste water solutions.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A process for decreasing the surface density of a porous precursor film, wherein the precursor film comprises a polymer selected from the group consisting of polyethylene, polypropylene, polyvinylidene, and polyvinylidene halides, the process comprising:

(a) attaching a first anchor to a major surface of the precursor film; and (b) applying a first shearing force to the major surface via the first anchor to remove at least a portion of a first surface layer from the precursor film.

2. The process of claim 1 wherein substantially all of at least one surface layer is stripped from the precursor film.

3. The process of claim 1 wherein a portion of both surface layers of the precursor film are stripped therefrom.

4. The process of claim 1 wherein the removed portion of the first surface layer is associated with the major surface.

5. The process of claim 1, wherein the first shearing force is applied at a substantially constant angle relative to the plane of the precursor film.

6. The process of claim 1, wherein the first shearing force is applied at an angle of 90° or less from the plane of the precursor film.

7. The process of claim 1, wherein the process is carried out in a reel-to-reel process in which:
   the precursor film is transferred from a feed roller to a collection roller;
   the first anchor is associated with a first stripping roller; and
   the first shearing force is applied by the first stripping roller.

8. The process of claim 1, further comprising:
   (c) attaching a second anchor to the opposing major surface of the precursor film; and
   (d) applying a second shearing force via the second anchor to the opposing major surface to remove at least a portion of a second surface layer from the precursor film.

9. The process of claim 8, wherein the at least a portion of the second surface layer is associated with the opposing major surface.

10. The process of claim 8, wherein the first and second shearing forces are applied simultaneously.

11. The process of claim 8, wherein the process is carried out in a reel-to-reel process in which:
    the precursor film is transferred from a feed roller to a collection roller;
    the first anchor is associated with a first stripping roller;
    the first shearing force is applied by the first stripping roller;
    the second anchor is associated with a second stripping roller; and
    the second shearing force is applied by the second stripping roller.

12. The process of claim 11, wherein the first and second anchor are the same, and the first and second stripping rollers are the same.

13. The process of claim 1 wherein the precursor film comprises a copolymer.

14. The process of claim 1 wherein the precursor film comprises a polymer selected from the group consisting of polyethylene, polypropylene, and ethylene-propylene copolymers.

15. The process of claim 1 wherein the precursor film comprises ultra-high molecular weight polyethylene.

16. The process of claims 1 wherein the precursor film is microporous.

17. A process for decreasing the surface density of a porous precursor film, the process comprising:
   (a) attaching a first anchor to a major surface of the precursor film; and
   (b) applying a first shearing force to the major surface via the first anchor to remove at least a portion of a first surface layer from the precursor film,
   wherein the precursor film is made by a process comprising the steps of forming a solution comprising a polyalkene into a film containing a solvent, cooling the resulting film to below the gelling point of the solution, removing the solvent to yield a substantially solvent-free film, and stretching the film- in at least one direction.

* * * * *